United States Patent [19]

Carrington et al.

[11] Patent Number: 4,497,229

[45] Date of Patent: Feb. 5, 1985

[54] ROTARY KNIFE CONTROL

[75] Inventors: Donald P. Carrington, Claremore; Andrew D. MacKay, Tulsa, both of Okla.

[73] Assignee: Combustion Engineering, Inc., Windsor, Conn.

[21] Appl. No.: 421,531

[22] Filed: Sep. 24, 1982

Related U.S. Application Data

[63] Continuation-in-part of Ser. No. 232,943, Feb. 9, 1981, abandoned.

[51] Int. Cl.[3] .......................... B26D 1/62; B26D 5/20; G06F 15/46

[52] U.S. Cl. .......................................... 83/76; 83/295; 83/298; 83/324; 364/475

[58] Field of Search ...................... 83/74, 76, 295, 298, 83/324, 71; 364/475

[56] References Cited

U.S. PATENT DOCUMENTS

| | | | |
|---|---|---|---|
| Re. 30,628 | 5/1981 | Tokuno et al. | 83/74 X |
| 3,614,572 | 10/1971 | Usher | 83/295 X |
| 4,183,271 | 1/1980 | Martin | 83/324 X |
| 4,266,276 | 5/1981 | Hayashi et al. | 83/76 X |
| 4,283,975 | 8/1981 | Knoll | 83/76 |

*Primary Examiner*—Frank T. Yost

*Attorney, Agent, or Firm*—David L. Smith; Arthur L. Wade

[57] ABSTRACT

A cylindrical, rotating knife is positioned to cut a moving body of flat sheet into predetermined lengths. An electric motor rotates the cylindrical knife. The knife motor is controlled by a system responsive to the travel of the sheet passing under the knife and the rotation of the knife, itself. The two measurements are fed to a control circuit to produce an output analog electrical signal to the knife motor which varies the rotational speed of the knife during the cutting cycle to avoid wastage of the sheet as it is cut.

5 Claims, 2 Drawing Figures

POSITION / VELOCITY PROFILE OF KNIFE 4

ROTARY KNIFE CONTROL

CROSS REFERENCE TO EARLIER FILED APPLICATION

This application is a continuation-in-part of application Ser. No. 232,943, filed Feb. 9, 1981, now abandoned.

TECHNICAL FIELD

The present invention relates to the control system of a rotating knife, actuating the knife to efficiently cut a moving sheet of material into predetermined lengths. More particularly, the invention relates to programming a knife motor with an electric network responding to the movement of a sheet of material being cut by the knife, and the knife rotation.

BACKGROUND ART

Rotating knives for cutting wallboard have been inadequately controlled and resulted in "paper pulling". This undersirable paper pulling has required up to 2 inches of each board to be trimmed before sealing with end tape, and, of course, the portion which was trimmed was scrap.

Attempts to overcome paper pulling were first made by installing an eccentric gear arrangement in the motor-to-knife gear train. This arrangement, when driven in a servo configuration with velocity and position feedback taken before the eccentric gears, yielded a desired position/velocity variation profile of the knife operation. The knife profile was synchronized with the board movement so as to reach their relative zero speeds at the 180 degree point of knife rotation. This is also the point of maximum knife penetration when cutting the wallboard.

The above modification corrected the slight error caused when the knife tip (which is synchronized with the moving wallboard) first entered the surface of the wallboard. At this point, the knife tip path was not perpendicular to the plane of the wallboard but rather the knife tip path was at an acute angle with the plane of the wallboard. Therefore, a position/velocity error between the knife tip and the wallboard (in an uncorrected system) was present during the cut, except when the knife tip is at the 6 o'clock, or 180°, position. This difference between the knife and wallboard positions caused the paper pulling and the position/velocity correction provided by the eccentric gears eliminated the paper pulling problem.

There is an inherent difficulty in the use of eccentric gearing between the knife and its motor to achieve the variation in the velocity/position profile of the knife necessary to carry out efficient cuts of wallboard sheets which have significant thickness. The gearing must be formed to change the velocity profile of the knife quickly and efficiently before the knife edge reaches the surface target on the board. The problem of the inevitable mechanical wear of the eccentric gearing should be eliminated and a direct control of the knife motor be carried out from an electronic system responsive to board travel under the knife and the knife rotation.

SUMMARY OF THE INVENTION

The present invention provides a feedback control system that controls the position of a rotating knife to emulate a rotating knife having eccentric gears. The rotary knife is held in a park position until a sufficient length of wallboard passes the location where the wallboard is cut such that when the rotary knife starts to rotate, assuming the rotary knife rotates synchronously with the wallboard line, the rotary knife would cut the wallboard line at the appropriate location. The position and velocity of both the wallboard line and the rotary knife are measured and compared. A rotary knife drive signal comprised of the following terms is generated:

A synchronous drive term that controls maintaining the rotary knife is park position and contributes to the knife drive signal when the knife is not in park position to drive the knife synchronously with the wallboard line.

The velocity and position error terms correct for velocity and position errors, for example, a change in wallboard line velocity and the inability to start the knife from rest to a speed synchronous with the wallboard line instantly.

Finally, a correction term is added to the knife drive signal just prior to, during and immediately following the knife penetrating the wallboard to emulate the effects of using eccentric gears to rotate the knife.

BEST MODE FOR CARRYING OUT THE INVENTION

Overview

Figure 1:
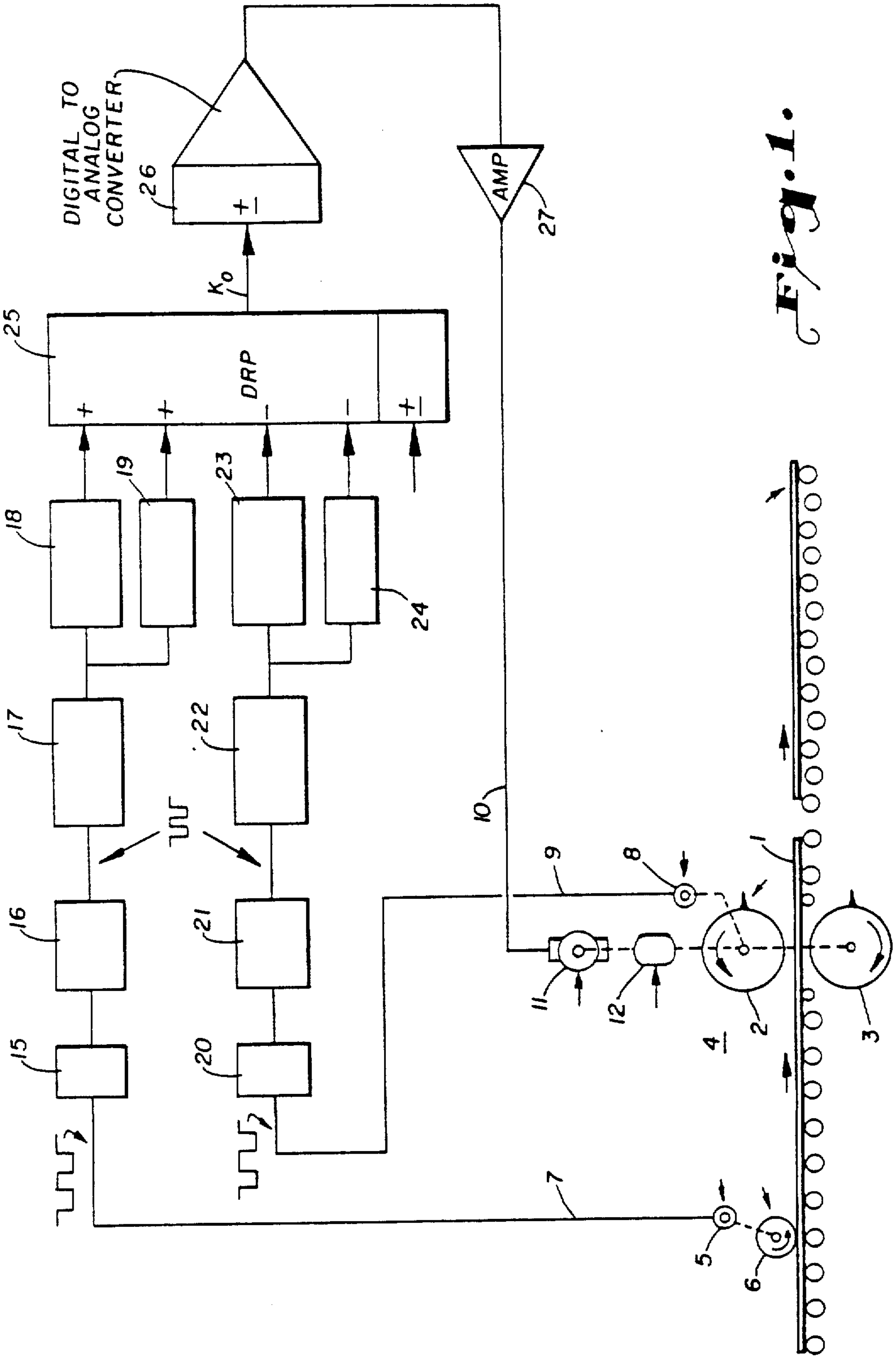
FIG. 1 is a diagrammatic and schematic of a control system for a wallboard knife in accordance with the invention.

The present invention is embodied in a system which controls a knife position to cleave a strip of material passing beneath the knife into predetermined lengths. Although not limited to the particular cutting duty disclosed, the knife in FIG. 1 is illustrated as actuated to cut green wallboard into predetermined lengths prior to their removal from their primary production line so they may be stacked on an assembly line where they are cured by furnace heat. Further, the knife, itself, is illustrated as comprised of two elongated cylinders, each cylinder having a cutting edge mounted thereon. The cylinders are geared together so they are simultaneously actuated by an electrical motor through a gear train. Obviously, the knife may take various forms with the common denominator of a cutting edge passed through the thickness of the wallboard sheet to make the required cleavage. Further details of this mechanical arrangement need not be disclosed beyond the representations of FIG. 1. The invention is embodied in the complete system which extends from the sensing structure of the wallboard travel and the knife rotation through the electronic system responsive to these inputs to produce an electric analog control signal for the knife motor which actuates the knife in its required cutting.

Only two active measurements are made in FIG. 1. A first train of electrical pulses is generated to represent the velocity/position of the wallboard line as it is moved by a conveyor. A second train of pulses is generated to represent the position/velocity of the knife edge in its rotation. These two trains of pulses, in electrical form, are fed into an electric network to generate a single analog electrical output signal to control the knife motor. The end result is actuation of the cutting edge of the knife to give it the position/velocity profile illustrated in FIG. 2. Again, in general, the profile determined for the knife will bring its edge to each target on the wallboard surface, and thereafter, with a predetermined speed, acceleration and deceleration, cut through the body of the wallboard to avoid distortion of the wallboard body. Following the cleavage action by the knife edge, the knife edge will be accelerated sufficiently to avoid interference with the wallboard body and thereby avoid distortion of the wallboard body.

Specific Structure

The sheet of material, or wallboard line, 1 is viewed in elevation as it rests on the rollers of a conveyor. The conveyor advances the line of wallboard 1 to the right, passing the wallboard between cylinders 2 and 3 of knife 4. Cylinder 2 rotates counter-clockwise; cylinder 3 rotates clockwise. A single edge is shown on each knife cylinder, these edges being brought together at the 6 o'clock, or 180°, position of roller 2. When the edges are brought together, a cleavage is made across the width of wallboard 1. When the travel of the wallboard is coordinated with the actuation of the knife, the wallboard is divided into lengths which are subsequently removed at a station, not shown, to the right.

A first train of pulses is generated by optical pulse generator 5. Generator 5 may be mechanically connected to roller 6 which is in direct contact with the surface of wallboard 1 as the board travels to the right. Of course, the generator 5 could be arranged in direct contact with the line of wallboard, itself. The output of generator 5 is placed on conductor 7 as the first train of electrical pulses, representative of the position/velocity of the board 1. Optical generator 8 is mechanically connected to knife 4. A second train of pulses is generated by pulse generator 8 and placed on conductor 9 as the generator output.

The two trains of pulses on 7 and 9 are fed into the electric network and registers in order to produce a single analog electrical control signal placed on 10. This analog electrical control signal is applied to regulate the speed of motor 11 in order that motor 11 will actuate knife 4 through gear train 12.

Computer System

First, the train of pulses representing the wallboard line, on conductor 7, is connected to and conditioned by buffer circuit 15. The conditioned output of buffer 15 is connected to quadrature detector circuit 16. The output signal of quadrature circuit 16 is connected to rate multiplier circuit 17. The output of the rate multiplier circuit 17 is connected, in parallel, to up/down counter 18 and frequency-to-digital converter 19.

Second, the train of pulses representing the knife actuation, on conductor 9, is connected to buffer 20, quadrature detector 21, rate multiplier 22, up/down counter 23 and frequency-to-digital converter 24. All of the outputs of 18, 19, 23 and 24 are connected to Difference Resolver and Processor (DRP) 25. It is within DRP 25 that the inputs of 18, 19, 23 and 24 are processed into a digital value which is applied to a digital-to-analog converter (D/A) 26. The output of D/A 26 is the analog signal, suitably amplified at 27, for knife motor conductor 10.

Before proceeding with an analysis of the manipulation of the input signals to the DRP 25, agreement must be had on the physical movement of knife 4 in relation to line 1. Upper cylinder 2 of knife 4 is discussed in terms of the position of its single edge as it is carried counter-clockwise from its park position at 3 o'clock. Obviously, the edge is carried from its 3 o'clock park position to and through its 12 o'clock position, 9 o'clock position, 6 o'clock position and returns to its park position. Immediately following completion of each cut by knife 4, cylinder 2 is held at its park position from which it is rotated in its precise synchronization with the linear travel of wallboard 1.

For the purpose of understanding the function of DRP 25 and its input from circuits 18, 19, 23 and 24 as well as the output of DRP 25, the following symbols are defined:

- $T_c$: Target cut—is both a hypothetical point on the wallboard line and a distance from the preceding cut equal to the length of wallboard to be cut
- $T_s$: Target start—is both a hypothetical point on the wallboard line and a distance from the preceding cut, closer to the preceding cut than $T_c$ by a distance equal to that portion of the circumference of the circular knife that the knife must pass through from the park position to the cut position hence $T_s = T_c - KxC$
- $L_p$: Line position—the length of the wallboard line which has passed the knife cut position subsequent to the last cut
- $K_p$: Knife position—the linear distance traversed by the circumference of the knife as measured from the park position of the knife
- $L_v$: Line velocity—the velocity of the wallboard line in units of length per unit time
- $K_v$: Knife velocity—the linear distance traversed by the knife per unit time
- $K_o$: Knife output—the knife drive signal (digital) presented to the digital-to-analog (D/A) converter
- B: Bias—bias derived from a lookup table, has the value of zero except where the knife/synchronization profile varies to emulate the curve shown in FIG. 2
- C: Circumference—circumference of the circular knife path
- D: Synchronous drive term—drive signal that maintains the knife in park position until $T_s$ passes the cut point, then contributes to the knife output signal
- $G_v$: Velocity error gain—a gain to weigh the significance given the difference in velocity between the wallboard line and the knife
- K: Fraction of circumference—a fraction, less than unity, which represents the portion of the circumference through which the knife must rotate in going from the park position to the cut position
- M: Multiplier—multiplier for system gain (overall)

The above defined variables are interrelated in the following equation:

$$K_o = (((L_p - T_s) - K_p)M) + G_v(L_v - K_v) + B + D$$

The variable K is dependent upon the location of the park position. Variable K is a fraction less than one that represents the portion of the circumference through which the knife must rotate in going from the park position to the cut position. The park position can be located anywhere around the circumference of the knife cylinder where the knife blade does not interfere with the passing of continuous wallboard line 1 that also allows rotating knife to accelerate to be synchronous with wallboard line 1 and have reduced the position error to zero before bias B is introduced. Hence K can range from approximately $\frac{1}{8}$ to approximately $\frac{7}{8}$. Generally a larger mass of knife 4, motor 11, and gear train 12 will require a larger K value because a larger mass, initially at rest, must be brought up to a speed synchronous with wallboard line 1. In the best mode, the park position of cylinder 2 was the 3 o'clock position, and since cylinder 2 rotated counterclockwise and since the cut position is at the 6 o'clock position of cylinder 2, variable K has the value of $\frac{3}{4}$.

At the same time that up/down counters 18 and 23 accumulate the pulses of their trains to provide a line positional reference in terms of digital values for the DRP 25, frequency-to-digtal converters 19 and 24 respond to the pulse trains to provide digital values representative of their respective velocities. The position/velocity reference values of the knife and wallboard line are presented continuously to DRP 25.

DRP 25 is a digital computer. It consists of an adder/logic element, memory, registers, and input/output ports. DRP 25 receives the outputs from 18, 19, 23 and 24 which respectively represent the knife position, $K_p$, knife velocity, $K_v$, line position, $L_p$, and line velocity, $L_v$, from their respective data paths from the processing of the train of pulses on conductors 7 and 9. These digital values are stored temporarily in DRP 25 memory then the equation defining knife output presented above is used to calculate an updated knife output. The knife output equation contains four terms: a position error term, a velocity error term, a correction term and a synchronous drive term.

The Position Error Term: $(((L_p-T_s)-K_p)M)$

Upon making the preceding cut, up/down counters 18 and 23 are reset to zero, variable $L_p$ is reset to zero and a new hypothetical point $T_c$ and hence a new hypothetical point $T_s$ are defined. $T_s$ defines the point which when passing between the axes of the knife cylinders 2 and 3 the knife must start rotating in order to cut the wallboard line at hypothetical point $T_c$ when $T_c$ is directly between the axes of knife cylinders 2 and 3 assuming that the knife tip will move in synchronization with the wallboard line. Since DRP 25 repeatedly processes the input values and calculates an updated knife drive signal $K_o$ at a rapid rate, a continuous record of the systems status exists. To determine when hypothetical point $T_s$ passes between the axes of knife cylinders 2 and 3, $L_p$ is repeatedly compared to $T_s$. $T_s$ remains fixed; $L_p$ increases from zero at the preceding cut to the value of $T_c$ at the subsequent cut. As long as $T_s$ is greater than $L_p$, DRP 25 holds knife 4 in the parked position because $T_s$ has not passed under the knife. When $L_p$ equals $T_s$, $T_s$ is directly between the axes of cylinders 2 and 3 of knife 4 and the knife is started to rotate.

Once $T_s$ passes between the axes of cylinders 2 and 3 of knife 4, the quantities $(L_p-T_s)$ and variable $K_p$ are compared repeatedly to determine whether the knife 4 is in the proper position relative to the wallboard line to make a cut at $T_c$. The quantity $(L_p-T_s)$ represents the length of wallboard that has passed between the axes of knife 4 since $T_s$ was between the axes of knife 4. $K_p$ represents the linear distance traversed by the circumference of the knife as measured from the park position of the knife. When there is a difference between the quantities $(L_p-T_s)$ and $K_p$, a position error exists and unless the position of the knife is changed relative to the wallboard, the wallboard will not be cut at point $T_c$. The position error term contributes to the knife output signal $K_o$ to correct the position of the knife relative to the wallboard. When the knife position $K_p$ is smaller than the length of wallboard that has passed between the axes of knife 4 since $T_s$, the position error term contributes positively to the knife output $K_o$ causing the knife to rotate more rapidly and hence to catch up to the wallboard line position. When the knife position is greater than the length of wallboard that has passed between the axes of knife 4 since $T_s$, the position error term subtracts from the knife output $K_o$ causing the knife to rotate more slowly and hence to allow the wallboard line position to catch up to the knife position. When there is no difference between $(L_p-T_s)$ and variable $K_p$, i.e. when $(L_p-T_s)-K_p=0$, knife 4 is in the proper position with respect to the wallboard line to make a cut in the wallboard line at hypothetical point $T_c$. The position error term reduces to zero and the knife output, $K_o$, consists of only the remaining terms provided they are non-zero. M is an adjustable bias variable used to determine overall system gain.

The Velocity Error Term: $G_v(L_v-K_v)$

A velocity error exists when the wallboard line velocity differs from the knife velocity. When the knife velocity is less than the line velocity, the velocity error term contributes positively to the knife output $K_o$ to cause the knife to increase in velocity to catch up to the line velocity. When the knife velocity is greater than the line velocity, the velocity error term subtracts from the knife output $K_o$ to allow the line velocity to catch up to the knife velocity. Obviously since the knife was initially at rest in the park position, the knife must travel faster than the line velocity to catch up to and become synchronous with the wallboard line. Thus, the velocity error gain $G_v$ weighs the significance given the velocity error term contribution to the knife drive signal. When the line velocity is the same as the knife velocity, that is, when the knife is synchronous with the line velocity, the velocity error term reduces to zero and thus does not contribute to the knife drive signal; knife output $K_o$ consists of only the remaining terms provided they are non-zero.

The Correction Term: B

Figure 2:
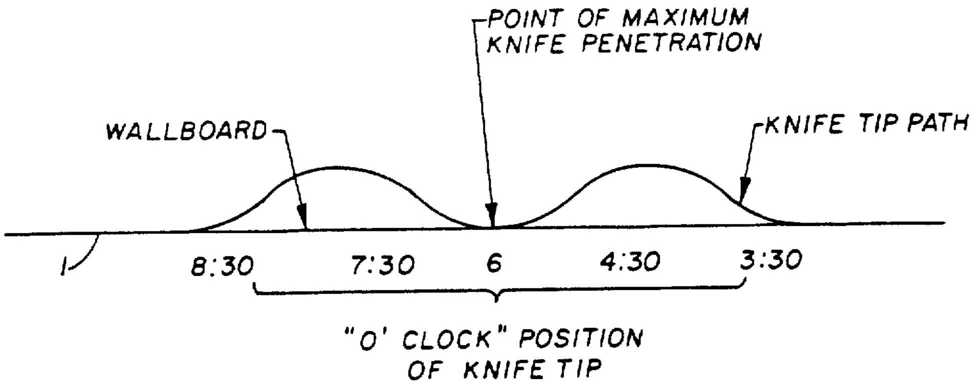
FIG. 2 is a representation of the knife and board position/velocity, including the portion of knife rotation where the wallboard is cut.

Variable B is a correction term which makes no contribution to the knife drive signal except where the knife/line synchronization profile varies to emulate the curve shown in FIG. 2. The variable B is implemented by way of a table look-up into the DRP 25. The contribution of variable B remains zero until the knife position $K_p$ equals a value which represents the point of rotation where the knife position is required to follow the profile of FIG. 2. The portion of the knife circumference over which variable B is non-zero varies depending on the mass of the knife, motor and gears as well as the power rating of the motor. A large motor driving a small knife and gears can introduce a correction more readily than a small motor driving a large knife and gears. With reference to cylinder 2, the variable B makes no contribution to the knife drive signal $K_o$ from the park position through the twelve o'clock position through the nine o'clock position to approximately the eight-thirty o'clock position as shown in FIG. 2. At the eight-thirty o'clock position of rotation of knife cylinder 2, variable B contributes to the knife drive signal $K_o$ by way of table look-up to emulate the effect of driving knife 4 with an eccentric gear arrangement. Thus, variable B assumes the value of the first location of the look-up table and, as a result, biases $K_o$ by that amount. As $L_p$ continues to increase by a measured amount, say several pulse increments, the first value of B from the table look-up is replaced by the second value of B in the table look-up, which biases the value of $K_o$ by the latter value of B. This sequence continues as the wallboard line continues to pass knife 4, i.e. as $L_p$ increases, through the values representing the cut (and beyond) with the table of B values being sequentially accessed and used in the equation solving for the knife drive signal $K_o$ until the knife tip is clear of the board, approximately at the three-thirty o'clock position as shown in FIG. 2, at which time the contribution of the variable B to the knife drive signal again returns to zero. It is obvious that the table of B values is arranged in a sequence which causes $K_o$ (after conversion to an analog signal in D/A 26) to cause the rotation of knife 4 to vary from exact synchronization with the linear movement of wallboard line 1, as shown in FIG. 2.

As shown in FIG. 2, the contribution of the correction term, B, to the knife drive signal $K_o$ is symmetrical about the six o'clock knife tip position since the wallboard line velocity is constant. The maximum contribution of the correction term B to the knife drive signal $K_o$ as the knife enters the wallboard occurs when the knife blade is approximately one-half of the distance between the knife position when the variable B first makes a contribution to the knife drive signal and the six o'clock position. In the preferred embodiment shown in FIG. 2, the maximum contribution of correction term B upon the knife entering the wallboard occurs at approximately the seven-fifteen o'clock position. Similarly, as the knife withdraws from the wallboard, having the point of maximum knife penetration at the six o'clock position, the point of maximum contribution to the knife drive signal $K_o$ by the correction term B upon withdrawal of the knife occurs at approximately the halfway point between the six o'clock position and the last knife position contributing a non-zero correction term B to the knife drive signal. In the preferred embodiment the maximum contribution of correction term B occurs at approximately the four-forty-five o'clock position. As stated above, the portion of the knife circumference over which the correction term B is non-zero varies depending upon the mass of the knife, motor and gears as well as the power rating of the motor. Furthermore, the correction term B contributes to the knife drive signal a magnitude to emulate the effect of driving knife 4 with an eccentric gear arrangement. Thus, the correction term B is curvilinear, symmetrical about the point of maximum knife penetration, having a maximum value in each symmetrical half that is approximately halfway between the point of maximum knife penetration and the most distant non-zero correction term on that symmetrical half of the curve and is effective to emulate the effect of an eccentric gear arrangement.

The Synchronous Drive Term: D

As long as $T_s$ is greater than $L_p$, DRP 25 holds knife 4 in the park position because $T_s$ has not passed the cut point. This is achieved by maintaining synchronous drive term D zero. Since the velocity error and position error do not contribute to $K_o$ until $T_s$ is greater than $L_p$ and since B is zero until cylinder 2 is at about the 8:30 o'clock position, drive signal $K_o$ is zero which maintains the knife in the park position. In addition to the function of maintaining knife 4 in the park position until $T_s$ passes the cut point, after $T_s$ passes the cut point, that portion of knife output $K_o$ contributed by D rotates knife 4 synchronous with wallboard line 1. Since knife 4, motor 11 and gear train 12 are initially at rest and cannot be brought up to synchronous speed instantly, velocity and position errors develop as knife 4 is started to rotate from the park position. The velocity error term and position error term discussed above correct velocity and position errors. When the velocity and position errors go to zero, it is the contribution of synchronous drive term D to knife output $K_o$ that causes knife 4 to continue to rotate. Synchronous drive term D also controls returning knife 4 to the park position after cutting off a length of wallboard line 1.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A system for cutting an elongated sheet of material, including a continuous sheet of elongated material with means to advance the sheet in a horizontal plane, a first electrical pulse generator engaging the sheet to detect the velocity/position of the sheet and establish a first train of pulses representative of the velocity/position of the sheet, a rotating knife positioned at a point in the path traveled by the sheet to cut the sheet in predetermined lengths, a motor connected to the knife for rotating the knife in accordance with an electrical analog signal, a second electrical pulse generator engaging the knife to generate a second train of pulses representative of the angular velocity/position of the knife, and means responsive to the first and second pulse trains for generating a knife motor signal to produce a knife blade rotation having a rotation velocity that is substantially sinusoidal as a function of knife rotary position while the knife is engaged with the sheet which cuts the sheet into predetermined lengths without distortion of the sheet material at the cut.

2. A system for cutting a continuous line of flat material, including, a continuous line of flat material to be cut into predetermined lengths, means for longitudinally advancing the line of flat material at a predetermined velocity, a knife located at a cutting station through which the line of material passes and characterized by a cylinder rotated counter-clockwise to bring a knife edge on the cylinder surface into cutting engagement with the line of material, a motor geared to the knife cylinder to rotate the knife cylinder in accordance with an electrical analog signal input to the motor, means responsive to the line of material to generate a first train of electrical pulses representative of the position/velocity of the line of material, means responsive to the knife cylinder rotation to generate a second train of electrical pulses representative of the angular velocity/position of the knife cylinder, means for receiving the first train of pulses and forming digital signals representative of line velocity, means receiving the second train of pulses and forming digital signals representative of knife cylinder angular position and digital signals representative of knife velocity, a computer network connected to receive the digital signals from the first and second trains of pulses and including an adder/logic section and memory section and register sections and table lookup section to manipulate the input digital signals in accordance with the formula:

$$K_o = (((L_p - T_s - K_p)M) + G_v(L_v - K_v) + B + D$$

in which:

$T_c$: Target cut—is both a hypothetical point on the wallboard line and a distance from the preceding cut equal to the length of wallboard to be cut $T_s$: Target start—is both a hypothetical point on the wallboard line and a distance from the preceding cut, closer to the preceding cut than $T_c$ by a distance equal to that portion of the circumference of the circular knife that the knife must pass through from the park position to the cut position hence $T_s = T_c - KxC$ $L_p$: Line position—the length of the wallboard line which has passed the knife cut position subsequent to the last cut $K_p$: Knife position—the linear distance traversed by the circumference of the knife as measured from the park position of the knife $L_v$: Line velocity—the velocity of the wallboard line in units of length per unit time $K_v$: Knife velocity—the linear distance traversed by the knife per unit time $K_o$: Knife output—the knife drive signal (digital) presented to the digital-to-analog (D/A) converter B: Bias—bias derived from a lookup table, has the value of zero except where the knife approaches the point of maximum penetration and passes beyond the point of maximum penetration where the knife/synchronization profile is curvilinear, symmetrical about the point of maximum knife penetration, having a maximum value in each symmetrical half that is approximately halfway between the point of maximum knife penetration and the most distant non-zero correction term on that symmetrical half of the curve, and is effective to emulate the effect of an eccentric gear arrangement C: Circumference—circumference of the circular knife path D: Synchronous drive term—drive signal that maintains the knife in park position until $T_s$ passes the cut point, then contributes to the knife output signal $G_v$: Velocity error gain—a gain to weigh the significance given the difference in velocity between the wallboard line and the knife K: Fraction of circumference—a fraction, less than unity, which represents the portion of the circumference through which the knife must rotate in going from the park position to the cut position M: Multiplier—multiplier for system gain (overall)

$K_o$ is the knife output signal in digital form, the $K_o$ signal being connected to the knife motor through a digital-to-analog converter causing the knife to carry its cutting edge in rotation and cutting the line of material into predetermined lengths with the cut through the material having a profile established by the bias value from the table lookup which avoids distortion of the material.

3. A system for cutting a continuous line of flat material as recited in claim 2 wherein variable K is selected from the range:

$$\frac{1}{4} \leq K \leq \frac{3}{4}$$

4. A system for cutting wallboard, including, a continuous sheet of wallboard with means to advance the sheet in a horizontal plane, a first electrical pulse generator engaging the wallboard to detect the velocity/position of the advancing wallboard and establish a first train of pulses representative of the velocity/position of the wallboard, a rotating knife positioned at a point in the path traveled by the wallboard to cut the wallboard in predetermined lengths, a motor connected to the knife for rotating the knife in accordance with an electrical analog signal, a second electrical pulse generator engaging the knife to generate a second train of pulses representative of the angular velocity/position of the knife, a counter and frequency-to-digital converter connected to the first electrical pulse generator to receive the first train of pulses to establish a first digital signal representative of the number of pulses generated by a predetermined length of wallboard and a second digital signal representative of the velocity of the first pulse train, a counter and frequency-to-digital converter connected to the second electrical pulse generator to receive the second train of pulses to establish a third digital signal representative of the number of pulses generated by the positional rotation of the knife and a fourth digital signal representative of the velocity of the second pulse train, a Difference Resolver and Processor connected to receive the four digital signals of the first and second pulse trains and containing a table lookup section which introduces a bias in the following formula by which the variables are manipulated:

$$K_o = (((L_p - T_s - K_p)M) + G_v(L_v - K_v) + B + D$$

in which:

$T_c$: Target cut—is both a hypothetical point on the wallboard line and a distance from the preceding cut equal to the length of wallboard to be cut $T_s$: Target start—is both a hypothetical point on the wallboard line and a distance from the preceding cut, closer to the preceding cut than $T_c$ by a distance equal to that portion of the circumference of the circular knife that the knife must pass through from the park position to the cut position hence $T_s = T_c - KxC$ $L_p$: Line position—the length of the wallboard line which has passed the knife cut position subsequent to the last cut $K_p$: Knife position—the linear distance traversed by the circumference of the knife as measured from the park position of the knife $L_v$: Line velocity—the velocity of the wallboard line in units of length per unit time $K_v$: Knife velocity—the linear distance traversed by the knife per unit time $K_o$: Knife output—the knife drive signal (digital) presented to the digital-to-analog (D/A) converter B: Bias—bias derived from a lookup table, has the value of zero except where the knife approaches the point of maximum penetration and passes beyond the point of maximum penetration where the knife/synchronization profile is curvilinear, symmetrical about the point of maximum knife penetration, having a maximum value in each symmetrical half that is approximately halfway between the point of maximum knife penetration and the most distant non-zero correction term on that symmetrical half of the curve, and is effective to emulate the effect of an eccentric gear arrangement C: Circumference—circumference of the circular knife path D: Synchronous drive term—drive signal that maintains the knife in park position unit $T_s$ passes the cut point, then contributes to the knife output signal $G_V$: Velocity error gain—a gain to weigh the significance given the difference in velocity between the wallboard line and the knife K: Fraction of circumference—a fraction, less than unity, which represents the portion of the circumference through which the knife must rotate in going from the park position to the cut position M: Multiplier—multiplier for system gain (overall)

$K_o$ is the knife output signal in digital form a digital-to-analog converter connected to the Difference Resolver and Process to receive the output $K_o$ and generate an analog signal connected to the knife motor to actuate the knife to cut the wallboard in predetermined lengths with the bias of the table lookup changing the $K_o$ signal to the motor to avoid paper tear.

5. A system for cutting wallboard as recited in claim 4 wherein variable K is selected from the range:

$$\frac{1}{8} \leqq K \leqq \frac{7}{8}.$$

* * * * *